J. CYSLER.
WIND SHIELD CLEANER.
APPLICATION FILED JUNE 29, 1917.
1,251,775.
Patented Jan. 1, 1918.
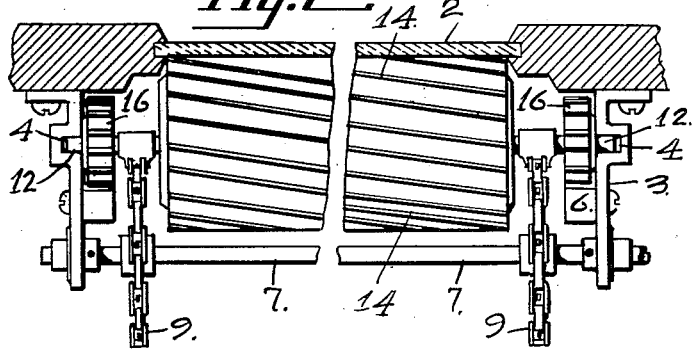
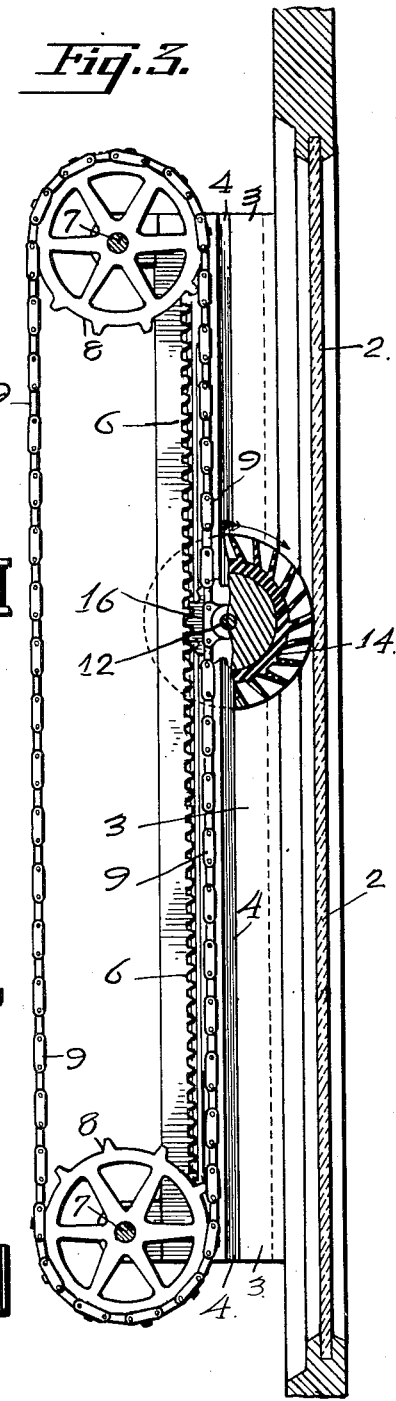
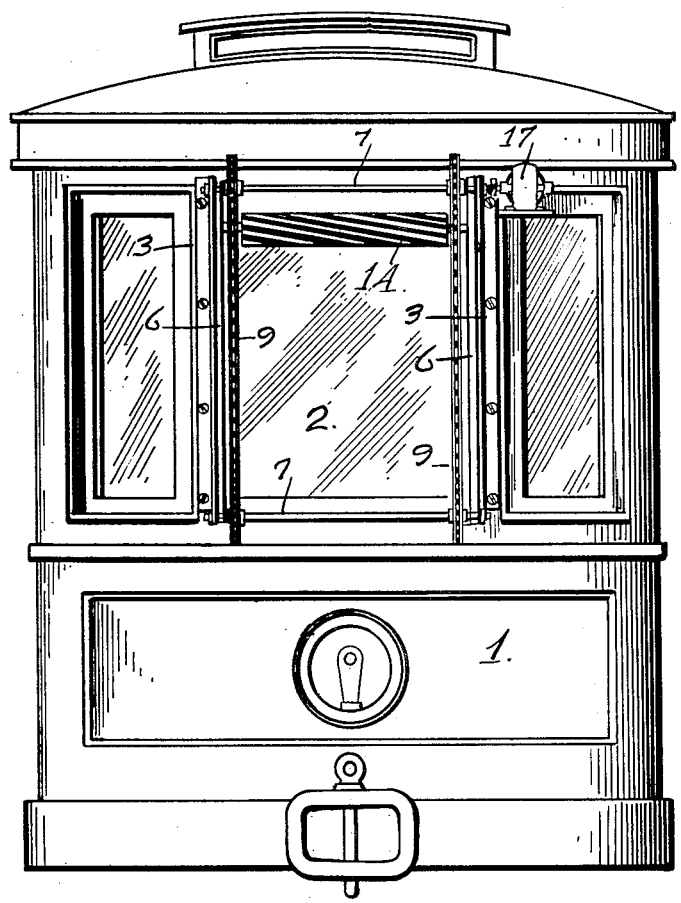
INVENTOR.
JOSEPH GYSLER.
BY Arthur L. Slee.
ATTORNEY.

UNITED STATES PATENT OFFICE.

JOSEPH GYSLER, OF SAN FRANCISCO, CALIFORNIA.

WIND-SHIELD CLEANER.

1,251,775.  Specification of Letters Patent.  Patented Jan. 1, 1918.

Application filed June 29, 1917. Serial No. 178,306.

*To all whom it may concern:*

Be it known that I, JOSEPH GYSLER, a citizen of the United States, residing in the city and county of San Francisco and State of California, have invented a new and useful Improvement in Wind-Shield Cleaners, of which the following is a specification.

My invention relates to an improvement in windshield cleaners in which a rotatable moisture removing element is mounted to move across the windshield and in contact with the glass thereof when moved in one direction and away from said glass when returning to a normal or inoperative position; and the objects of my invention are First, to provide an improved windshield cleaner adapted to be used in connection with the observation windows or windshield of electric cars, locomotives and the like;

Second, to provide improved means whereby an operator of a vehicle may readily remove snow or moisture due to fog or rain, or other matter from the outside of the glass to retain an unobstructed vision of the roadway;

Third, to provide an improved rotatable moisture removing element to engage the glass of a windshield to remove moisture, snow and other matter therefrom.

I accomplish these several features by means of the device disclosed in the drawings forming a part of the present specification wherein like characters of reference are used to designate similar parts throughout the said specification and drawings, and in which—

Figure 1 is a front elevation of an electric car disclosing my invention applied thereto;

Fig. 2 is an enlarged broken plan view of the device with a portion of the car front or windshield shown in section; and Fig. 3 is an enlarged vertical sectional view of the device.

Referring to the drawings the numeral 1 is used to designate in general a trolley or electric car provided with the usual front window or windshield 2.

Upon each side of the windshield 2 is mounted a bracket 3 having a vertically disposed groove 4 and a rack 6.

Shafts 7 are rotatably mounted between the upper and lower ends of the brackets 3 and are provided with suitable sprockets 8 on the ends thereof over which sprockets 8 are mounted a pair of endless belts 9.

A shaft 12 is rotatably mounted between the belts 9 and is provided with a moisture removing element 14 preferably in the shape of a flexible rubber roller 14 having radially extending helical flanges as disclosed in Fig. 3 of the drawings.

Each end of the shaft 12 is provided with a pinion 16 arranged to mesh with the racks 6 whereby the roller 14 may be rotated when moved downward by the endless belts 9.

In order to retain the roller or moisture removing element 14 in contact with the glass of the windshield 2 and the pinions 16 in mesh with the racks 6 the ends of the shaft 12 slidably engage the grooves 4 in the brackets 3.

The upper shaft 7 may be connected to any suitable motor such as the electric motor disclosed in Fig. 1 of the drawings.

The operation is as follows:

When the glass of the windshield 2 becomes foggy or moisture laden to a degree sufficient to obstruct the vision the said glass may be cleaned on the outside by starting the motor 17 which will cause the upper shaft 7 to rotate the endless belts 9 and move the shaft 12, carrying the moisture removing element 14 downward.

As the shaft 12 moves downward the pinions 16 thereon meshing with the racks 6 will rotate said shaft 12 and the roller 14 thereon in the direction indicated by the curved arrow in Fig. 3 of the drawings thereby removing the moisture or other elements or matter from the glass 2.

As the shaft 12 reaches the bottoms of the grooves 4 in the brackets 3 said shaft is carried away from the window or windshield 2 and around the lower sprockets 8 returning upward away from the window 2.

As the shaft 12 is carried around the upper sprockets 8 the said shaft is again placed in connection with the upper ends of the grooves 4 and the racks 6. At this point however, the motor is stopped to retain the moisture removing element at the upper portion of the window so as not to obstruct the view of the operator.

It is obvious that the window may be cleaned as often as necessary as when in a snow storm or heavy rain where moisture or snow will quickly gather upon the glass 2 to obstruct the view.

It is also evident from the foregoing that I have provided an improved windshield cleaner adapted to move downward in contact with the glass to be cleaned and to be returned to normal or inoperative position away from said glass.

Having thus described my invention what I claim as new and desire to secure by Letters Patent is—

1. The combination of a rotatable moisture removing element mounted to move across a windshield and in contact with the glass thereof when moved in one direction and apart from said glass when moved in the opposite direction; and means for rotating the said element when moved in contact with said glass.

2. The combination of an endless belt mounted upon each side of a windshield; a rotatable moisture removing element rotatably mounted between the belts and carried by said belts against the glass of the windshield when moved in one direction and away from said glass when moved in the opposite direction; a pair of pinions secured to the rotatable element; and suitable racks to engage the pinions to rotate the moisture removing element when the said element is moved in contact with the glass.

3. The combination of an endless belt mounted upon each side of a windshield; a rotatable moisture removing element rotatably mounted between the belts and carried by said belts against the glass of the windshield when moved in one direction and away from said glass when moved in the opposite direction; a pair of pinions secured to the rotatable element; suitable racks to engage the pinions to rotate the moisture removing element when the said element is moved in contact with the glass; and means for retaining the engagement of the pinions with the racks while the rotatable moisture removing element is moving in contact with the glass.

In witness whereof I hereunto set my signature.

JOSEPH GYSLER.